United States Patent
Liu et al.

(10) Patent No.: US 10,920,390 B2
(45) Date of Patent: Feb. 16, 2021

(54) TREATMENT SYSTEM AND METHOD FOR EX-SITU CARBONIZATION AND SOLIDIFICATION OF SILT SOIL USING ACTIVE MAGNESIUM OXIDE

(71) Applicant: SOUTHEAST UNIVERSITY, Nanjing (CN)

(72) Inventors: Songyu Liu, Nanjing (CN); Guanghua Cai, Nanjing (CN); Liang Wang, Nanjing (CN); Chuan Qin, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 197 days.

(21) Appl. No.: 16/310,820

(22) PCT Filed: Dec. 26, 2017

(86) PCT No.: PCT/CN2017/118447
§ 371 (c)(1),
(2) Date: Dec. 18, 2018

(87) PCT Pub. No.: WO2019/100512
PCT Pub. Date: May 31, 2019

(65) Prior Publication Data
US 2020/0115875 A1   Apr. 16, 2020

(30) Foreign Application Priority Data

Nov. 24, 2017   (CN) .......................... 201711194796.9
Nov. 24, 2017   (CN) .......................... 201711194797.3

(51) Int. Cl.
*E02D 3/12*   (2006.01)

(52) U.S. Cl.
CPC ...................................... *E02D 3/12* (2013.01)

(58) Field of Classification Search
None
See application file for complete search history.

(56) References Cited

FOREIGN PATENT DOCUMENTS

| CN | 101254996 A | 9/2008 |
|---|---|---|
| CN | 101863601 A | 10/2010 |
| CN | 102102360 A | 6/2011 |
| CN | 102267796 A | 12/2011 |
| CN | 102381868 A | 3/2012 |

(Continued)

*Primary Examiner* — Colin W. Slifka
(74) *Attorney, Agent, or Firm* — Bayramoglu Law Offices LLC

(57) ABSTRACT

A method for an ex-situ carbonization and solidification of silt soil using an active magnesium oxide, pertaining to the field of civil and hydraulic engineering. The method includes the steps of silt pretreatment, homomixing of solidifying agents, silt granulation, carbonization by carbon dioxide, exhaust gas/waste liquid collection, and resource utilization. In the method, the supply amount of the solidifying agent is adjusted through the actual measurement of the moisture content, and the granule size and carbon dioxide pressure are adjusted according to the soil properties. Therefore, a full mixing of the silt with the solidifying agents and a rapid carbonization of the magnesium oxide solidified silt granules can be achieved. Moreover, the dust and carbon dioxide can be absorbed during the operation, thereby avoiding secondary pollution. The silt carbonized granules can be used as filling materials for roadbeds, airport runways, engineering backfills, etc.

8 Claims, 1 Drawing Sheet

(56) References Cited

FOREIGN PATENT DOCUMENTS

| | | |
|---|---|---|
| CN | 103147434 A | 6/2013 |
| CN | 103319067 A | 9/2013 |
| CN | 103910503 A | 7/2014 |
| CN | 103981854 A | 8/2014 |
| CN | 104018485 A | 9/2014 |
| CN | 104912055 A | 9/2015 |
| CN | 106869120 A | 6/2017 |
| JP | 2015127050 A | 7/2015 |

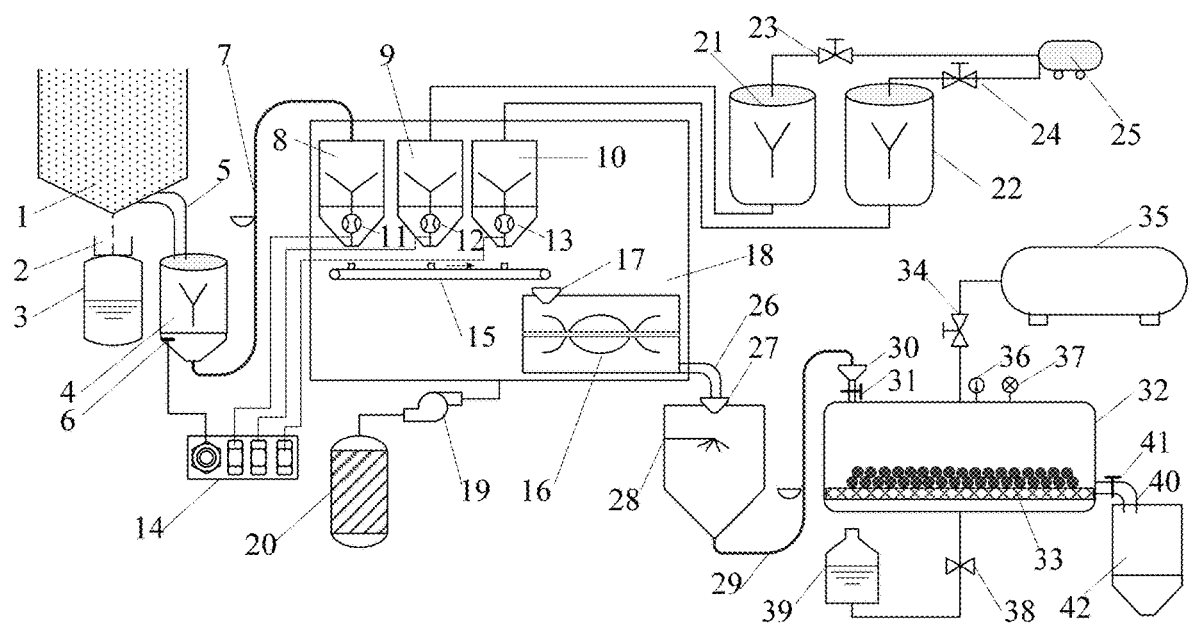

TREATMENT SYSTEM AND METHOD FOR EX-SITU CARBONIZATION AND SOLIDIFICATION OF SILT SOIL USING ACTIVE MAGNESIUM OXIDE

CROSS REFERENCE TO RELATED APPLICATIONS

This application is the national phase entry of International Application No. PCT/CN2017/118447, filed on Dec. 26, 2017, which is based upon and claims priority to Chinese Application No. 201711194797.3, filed on Nov. 24, 2017, and Chinese Application No. 201711194796.9, filed on Nov. 24, 2017, the entire contents of which are incorporated herein by reference.

TECHNICAL FIELD

The present invention relates to a treatment system and a method for solidification of silt soil generated in rivers, lakes, civil and hydraulic engineering, and particularly to a method for ex-situ carbonization and solidification of silt soil using an active magnesium oxide, which is suitable for treating the silt with high moisture content and low permeability, and can realize the recycling of the resource of silt and carbon dioxide in engineering construction. The present invention pertains to the field of consolidation of the rock-soil for civil construction or the special soil for municipal engineering.

BACKGROUND

China has a vast territory with numerous rivers and lakes, and the civil engineering construction is developing at a high speed. A large amount of silt will be produced during the dredging of rivers and lakes and the construction of civil and hydraulic engineering. The silt has the characteristics of high moisture content, high clay content, poor water permeability, and poor physical and mechanical indexes, etc. The silt in some rivers and lakes even contains a lot of organic matter and harmful heavy metals. The silt is difficult to directly use as a filling material in engineering, and if it is not properly treated, it will occupy a large number of fertile fields. At the same time, the sewage in the silt easily penetrates underground, causing a series of social problems such as pollution of underground water sources, etc. At present, methods such as vacuum preloading precipitation, heat treatment, pump drainage precipitation drying or silt dumping disposal, and consolidation with solidifying agent, etc. are generally used at home and abroad for treating the soft silt foundations. The vacuum preloading method reduces the moisture content of the silt by means of atmospheric pressure, which is a relatively common physical construction method for improving the bearing capacity of on-site silt. However, since the vacuum preloading method has the disadvantages such as the construction period is at least half a year, and the bearing capacity of the treated foundation is poor (below 60 kPa), etc., it is difficult to be popularized on a large scale. The heat treatment method converts the silt into a building material by heating or sintering, as the method has small treating capacity and high cost, and therefore is difficult to be popularized and utilized on a large scale. Precipitation drying or silt dumping disposal will occupy a large number of stacking areas. The low permeability of the silt makes it difficult to reuse the occupied areas in a short period of time, which not only increases the construction costs, but also easily causes air pollution and secondary environmental pollution in the process of pump drainage or ex-situ filling. Solidification with a solidifying agent is the most promising treatment technology, that is, a solidifying agent is added to the silt for stirring and mixing, and then a pulling and paving or a stacking consolidation is carried out to change the properties of the silt.

At present, the solidifying agents used in soil improvement and silt solidification at home and abroad mainly include high polymer type solidifying agents, electro-ion solution type solidifying agents and slag silicate type solidifying agents, etc. These solidifying agents can improve the compressive strength of silt and soil. Although the high polymer type solidifying agents are required to be added in a low amount and are convenient for transportation, the water-resistance performance of the solidified soil is poor, and the strength of the solidified soil drops sharply when exposed to water. Although the electro-ion solution type solidifying agents fundamentally change the surface properties of the silt granules, so that the silt tends to be hydrophobic, and therefore achieves good strength and water-resistance performance, these solidifying materials have complex components and high cost, and the additives in the components are harmful for the environment and easily cause pollution to the soil and the environment. The slag silicate type solidifying agents include cement, lime or steel slag, fly ash, slag and furnace slag, etc. This kind of solidifying agent is required to be added in a large amount of 120-400 kg/m$^3$ when used alone, and the increase in strength of the solidified silt is limited, which is only 0.1-0.6 MPa. Therefore, it is difficult to popularize the slag silicate type solidifying agents on a large scale. Chinese patent application No. 201310204944.6 discloses "an environment-friendly silt solidification method", that is, an industrial waste, i.e., slag of iron tailings, is used as a skeletal material, a mixture of Portland cement and calcium carbide slag is used as a solidifying agent. Then, the skeletal material and the solidifying agent are mixed and used for the solidification treatment of the silt, and the infinite compressive strength of the solidified silt is improved remarkably. Based on the foregoing analysis, these methods have solved the storage problem of soil and silt for engineering construction to some extent, but these solidifying agents have obvious defects. Namely, cement solidifying materials also have shortcomings such as high energy consumption (calcination temperature reaches up to 1450° C.), large emissions of carbon dioxide, and serious environmental pollution, etc. in the production process. In the production of construction materials such as cement and lime, etc., the emissions of pollutants such as dust and carbon dioxide gas, etc. are increasing, which is a barrier that restricts the stable developments of the economic environment and socialization. Therefore, the search for new environment-friendly materials to replace traditional Portland cement is a new direction in the research of material science and environmental geology.

The inventor's research group proposed an in-situ consolidation treatment of soft foundations carried out by the carbonized mixing pile method using magnesium oxide and the integral carbonization method, and applied for a series of patents, such as: "soil carbonization and solidification method and device thereof" (201010604013.1), "treatment system and method for thermal stabilization of soft soil foundation by using industrial waste gas" (201310122135.0), "treatment system for foundation consolidation and carbonized pile construction method" (201410203978.8), "carbonization and consolidation method for replacement cushion layer of soft soil foundation" (201410272957.1), "in-situ carbonization and solidification treatment method for shallow soft foundation" (201510348797.9), "carbonized mixing pile-breathable pipe pile composite foundation and construction method thereof" (201710225231.6), etc. The similar characteristics of these invention are that the active oxide is used as the soil solidifying agent, carbon dioxide is introduced to carbonize the soil to realize the consolidation treatment of the soft foundation soil, which has the characteristics of high consolidation speed, high strength and good environmental benefits, etc., and conforms to the development trend of green construction of civil engineering. However, these inventions are applicable to the in-situ consolidation of foundation soil. The consolidation effect is affected by the soil properties, moisture content and porosity of the natural foundation soil, a large amount of carbon dioxide was wasted during the construction process, and there is obvious uneven carbonization. It is difficult to adapt to the carbonization and consolidation of silt/sludge soil with high moisture content and low permeability.

Combined with the current characteristics of silt/sludge soil and the characteristics and problems of the consolidation treatment technology available now, and based on the current situation of rapid development of engineering construction in China, how to treat silt with a low-carbon, high-efficiency, economical and reasonable method and use it in the engineering construction has become an urgent issue to be solved for the industry.

SUMMARY

The present invention provides a treatment system and a method for ex-situ carbonization and solidification of silt soil using an active magnesium oxide, aiming at solving the problems, such as poor uniformity of carbonization, serious waste of carbon dioxide, and unsuitability for the silt with high moisture content, etc., of the carbonization and consolidation technology available now. Through several steps of silt pretreatment, homomixing of solidifying agents, silt granulation, carbonization by carbon dioxide, exhaust gas/waste liquid collection, and reutilization of resource, the problems that the silt with high moisture content and low permeability is difficult to be applied in engineering and is difficult to be carbonized and solidified are solved. Moreover, the present invention greatly improves the uniformity of carbonization and has a wider application range, aiming at realizing the reuse of the resource of silt/sludge and carbon dioxide in engineering construction. At the same time, a plurality of sensors specially provided in the system can be used cooperatively to adjust the supply amount of the solidifying agent through the actual measurement of the moisture content, adjust the granule size and carbon dioxide pressure according to the soil properties, thereby greatly improving the work efficiency. The whole device is more systematic and procedural, and the device can absorb dust and carbon dioxide during use, thereby avoiding secondary pollution. The carbonized granules of the silt generated after the operation of the device have great hardness and high shear strength, which can be used as filling materials for roadbeds, airport runways, engineering backfills, etc., and are of great significance for the reuse of silt/sludge and carbon dioxide in engineering.

In order to achieve the above objectives, the present invention discloses a treatment system for ex-situ carbonization and solidification of silt soil using an active magnesium oxide, characterized in that, the treatment system includes a pretreatment device, a solidifying agent supply device, a homomixing device, a granulating device, a carbonization device and a collection device.

The pretreatment device is respectively connected to a water storage tank and a buffer bin, and the buffer bin is further provided with a moisture sensor.

The homomixing device mainly includes a metering hopper A, a metering hopper B, a metering hopper C, a conveyor belt, a homomixing stirrer and a feed hopper A. The metering hopper A is connected to the buffer bin through a picking device A. The conveyor belt is located at lower portions of the metering hopper A, the metering hopper B, and the metering hopper C. The feed hopper A is located below a blanking end of the conveyor belt, and the feed hopper A is fixed above the homomixing stirrer. The metering hopper A, the metering hopper B, and the metering hopper C are respectively provided with a metering sensor A, a metering sensor B and a metering sensor C at their bottom.

The solidifying agent supply device includes at least a first storage tank and a second storage tank, and the first storage tank and the second storage tank are respectively connected to an air compressor through a vent pipe. A first pressure regulating valve is disposed on the connecting vent pipe of the first storage tank, and a second pressure regulating valve is disposed on the connecting vent pipe of the second storage tank. The bottom of the first storage tank and the bottom of the second storage tank are further respectively connected to the upper part of the metering hopper B and the upper part of the metering hopper C through a vent pipe.

The granulating device is located below the homomixing device, and the top of the granulating device is provided with a feed hopper B. The feed hopper B is connected to the bottom of the homomixing stirrer through a conveying pipe.

The carbonization device includes a feed hopper C, a carbonization chamber, a vibrating screen, a gasholder, a temperature sensor, and a pressure sensor. The feed hopper C is connected to the bottom of the granulating device through a picking device B, and the feed hopper C is connected to the top of the carbonization chamber through a pipe. A feed valve is arranged on the connecting pipe. The vibrating screen is located inside the carbonization chamber and is located below the feed hopper C. The temperature sensor and the pressure sensor are disposed on an upper portion or a side wall of the carbonization chamber. The gasholder is connected to the top of the carbonization chamber through a vent pipe, and a third pressure regulating valve is further disposed on the vent pipe.

The collection device includes at least a lye tank and a storage bin. The lye tank is connected to the bottom of the carbonization chamber through a pipe, and the connecting pipe is provided with a control valve. The storage bin is connected to the lower part of the carbonization chamber through a discharge pipe, and the discharge pipe is provided with a discharge valve.

As an improvement of the present invention, the treatment system further includes a purification device, the purification device is connected to the homomixing device through a pipe, and the connecting pipe is provided with an exhaust fan.

As a further improvement of the present invention, the pretreatment device is provided with a debris removal interlayer, a sediment separation interlayer, and a dehydration and capacity reduction interlayer from top to bottom.

As a further improvement of the present invention, the moisture sensor, the metering sensor A, the metering sensor B, and the metering sensor C are connected to an integrated controller through wires, respectively.

As a further improvement of the present invention, the maximum aperture of the vibrating screen is smaller than the minimum granule size produced by the granulating device.

In order to achieve the above objectives, the present invention further discloses an application of a treatment system for ex-situ carbonization and solidification of silt soil using an active magnesium oxide in silt. The granule size granulated by the granulating device in the treatment system can be dynamically adjusted according to the soil properties and moisture content of the silt.

In order to achieve the above objectives, the present invention further discloses a method for ex-situ carbonization and solidification of silt soil using an active magnesium oxide, including the following steps.

a. Silt pretreatment: removing the solid debris from the silt to be treated in the pretreatment device, subsequently performing a sediment separation, and a dehydration and capacity reduction through a mechanical screen to obtain pretreated water and pretreated soil;

b. homomixing of solidifying agent: dropping the soil obtained after the step a, the first solidifying agent, and the second solidifying agent onto a conveyor belt respectively through a corresponding metering hopper, and transferring into a homomixing device by the conveyor belt for uniform stirring; wherein the ratio of the soil to the first solidifying agent and to the second solidifying agent is adjusted by a metering sensor;

c. silt granulation: sending a mixture after mixing and homomixing to a granulating device to perform a granulation operation of the mixture to obtain solidified granules of the mixture;

d. carbonization by carbon dioxide: sending the solidified granules of the mixture obtained after the step c to a vibrating screen in a carbonization chamber, and after the vibrating screen is covered by the solidified granules, opening the pressure regulating valve to carbonize the solidified granules of the mixture to generate silt carbonized granules;

e. exhaust gas/waste liquid collection: collecting the carbonized granules generated after the step d, and simultaneously absorbing the waste liquid and the exhaust gas produced in the technological process by using lye; and f. resource utilization: reusing the silt carbonized granules obtained after the above steps as materials for roadbeds, airport runways or engineering backfills.

As an improvement of the present invention, moisture monitoring value of the pretreated soil obtained after the step a is obtained through a moisture sensor. The soil, the first solidifying agent and the second solidifying agent in the step b are respectively provided with a metering sensor A, a metering sensor B and a metering sensor C.

The metering sensor A is first adjusted to any reference value, then the metering sensor B is adjusted according to the moisture monitoring value, and the metering sensor C is adjusted according to the target strength and hardness of the silt granules.

As a further improvement of the present invention, the solid debris in the step a are removed by a mechanical nail rake or a mechanical screen; the sediment separation is mainly achieved through mechanical centrifugation or geonet bag.

As a further improvement of the present invention, the first solidifying agent may be an anhydrous magnesium chloride powder or a powder mixture of anhydrous magnesium chloride and anhydrous calcium chloride; and the second solidifying agent may be an active magnesium oxide powder or a powder mixture of active magnesium oxide and calcium oxide.

As a further improvement of the present invention, the solidified granules of the mixture obtained after the step c have a granule size ranging from 1 cm to 10 cm.

As a further improvement of the present invention, the lye in the step e is mainly a sodium hydroxide solution.

Compared with the prior art, the present invention has the following advantages.

(1) The solidifying agent and the silt are flexibly proportioned, and the working efficiency is higher. The metering sensor specially provided in the step of homomixing the solidifying agents can be used to adjust the amount of two solidifying agents to be added in real time according to the moisture content of silt, so as to achieve the optimal working efficiency.

(2) The granule size of the solidified granules of the mixture can be adjusted to adapt to a wider range. In the step of silt granulation, the granule size of the granulated granules can be adjusted according to the soil properties, and the application range of this method is widened. This method solves the problems that the silt treatment and engineering application are difficult to be applied in the silt with high moisture content, and has a better operationality.

(3) The solidifying agent is stirred uniformly, and the continuous operation rate is high. The homomixing of two different kinds of solidifying agents and the silt is achieved by a homomixing stirrer. Moreover, the granule size of the granulated granules can be adjusted according to the soil properties to meet the subsequent carbonization of the granules. Several processes can be operated continuously, and the overall operation has a higher consistency and integrity.

(4) High carbon dioxide utilization and good carbonization uniformity. The mobile carbonization chamber and the vibrating screen in the carbonization chamber are used to enable the magnesium oxide solidified granules to be fully carbonized, thereby avoiding the escape and waste of carbon dioxide during in-situ carbonization and solidification, improving the utilization efficiency of carbon dioxide. Meanwhile, the uniformity of the carbonization effect of the magnesium oxide solidified silt granules is improved by the vibration of the granules.

(5) Good treatment effect. The method of the present invention does not require long-term curing, can complete carbonization in a short time (less than 3 hours) and significantly reduce the moisture content of the silt granules, and improve the strength and hardness of the silt granules.

(6) A moisture sensor is specifically provided, which can detect the moisture content of the silt soil, and combined with three different metering sensors, the amount of two solidifying agents to be added can be adjusted in real time to achieve the optimal working efficiency.

(7) A purification device is further provided for absorbing the carbon dioxide released during the processes of silt pretreatment and the homomixing to avoid pollution to the surrounding environment, which is highly efficient, environment-friendly and has long-term sustainability, and at the same time, can prolong the service life of the system, and reduce the economic costs.

(8) The three-layer layered structure of the pretreatment device maximizes the separation of silt and water, and provides a strong guarantee for the subsequent homomixing, granulation and carbonization, and the structure is simple and easy to operate, which can shorten the processing time of the whole system and is more efficient.

(9) All sensors are connected to the integrated controller, the structure is highly uniform, the system is more consistent, easy to use and easy to operate. The automatic operation with well-setting parameters greatly reduces the labor, accelerates the process and saves the overall cost, and has a wider application range.

(10) The maximum aperture of the vibrating screen is smaller than the minimum granule size produced by the granulating device, which can achieve a sufficient carbonization and solidification of the silt soil, thereby providing a strong guarantee for the subsequent system treatment, improving the working efficiency, and optimizing the treatment efficiency of the silt soil at the maximum.

(11) Recycling of resources. By using the present invention, the waste silt/sludge is treated into a geotechnical building material with good engineering properties, which can be used as filling materials for roads, dam bodies, airport runways, and engineering backfills, etc., and has advantages of full utilization, high efficiency and environment-friendly, and resource recycling.

(12) Environmental protection. The present invention can reduce a large amount of land occupied by silt generated in engineering due to waste disposal of the silt, and reduce pollution to the surrounding environment. This method uses environment-friendly active magnesium oxide as the main solidifying agent, and it can fully absorb a large amount of carbon dioxide gas during the carbonization and consolidation process. Meanwhile, a waste liquid/exhaust gas absorption device is provided in the stirring and carbonization process, and the whole process has the advantages of having low-carbon footprint and being environment-friendly and sustainable.

BRIEF DESCRIPTION OF THE DRAWINGS

FIG. 1 is a structural schematic diagram of an ex-situ treatment system for carbonization and solidification of silt soil using an active magnesium oxide.

In the drawing: 1. pretreatment device, 2. filtration device, 3. water storage tank, 4. buffer bin, 5. silt conveying pipe, 6. moisture sensor, 7. picking device A, 8. metering hopper A, 9. metering hopper B, 10. metering hopper C, 11. metering sensor A, 12. metering sensor B, 13. metering sensor C. 14. integrated controller, 15. conveyor belt, 16. homomixing stirrer, 17. feed hopper A, 18. homomixing device, 19. exhaust fan, 20. purification device, 21. first storage tank, 22. second storage tank, 23. first pressure regulating valve, 24. second pressure regulating valve, 25. air compressor, 26. material conveying pipe, 27. feed hopper B, 28. granulating device, 29. picking device B, 30. feed hopper C, 31. feed valve, 32. carbonization chamber, 33. vibrating screen, 34. third pressure regulating valve, 35. gasholder, 36. temperature sensor, 37. pressure sensor, 38. control valve, 39. lye tank, 40. discharge pipe, 41. discharge valve, 42. storage bin.

DETAILED DESCRIPTION OF THE EMBODIMENTS

In the description of the present invention, it should be understood that the terms such as "upper/up", "lower/down", "top", "bottom", "inside/inner", "outside/outer", etc. indicate the locations or positional relationships based on the locations or positional relationships shown in the drawing, which are merely used to facilitate the description of the present invention, rather than indicate or imply that the device referred to must have a specific orientation. Therefore, these terms shall not be interpreted as limiting to the present invention. In order to make the technical means, the creative features, the objectives and the effects achieved by the present invention easy to understand, the present invention will be further described below with reference to the drawing.

A treatment system for ex-situ carbonization and solidification of silt soil using an active magnesium oxide includes a pretreatment device 1, a solidifying agent supply device (21, 22, 23, 24, 25), a homomixing device 18, a granulating device 28, a carbonization device (30, 32, 33, 35, 36, 37) and a collection device (38, 39, 40, 41). The pretreatment device 1 is respectively connected to a water storage tank 3 and a buffer bin 4, and the buffer bin 4 is further provided with a moisture sensor 6. The homomixing device 18 mainly includes a metering hopper A8, a metering hopper B9, a metering hopper C10, a conveyor belt 15, a homomixing stirrer 16 and a feed hopper A17. The metering hopper A8 is connected to the buffer bin 4 through a picking device A7. The conveyor belt 15 is located at lower portions of the metering hopper A8, the metering hopper B9, and the metering hopper C10. The feed hopper A17 is located below a blanking end of the conveyor belt 15, and the feed hopper A17 is fixed above the homomixing stirrer 16. The metering hopper A8, the metering hopper B9, and the metering hopper C10 are respectively provided with a metering sensor A11, a metering sensor B12 and a metering sensor C13 at their bottom. The solidifying agent supply device includes at least a first storage tank 21 and a second storage tank 22, and the first storage tank 21 and the second storage tank 22 are respectively connected to an air compressor 25 through a vent pipe. A first pressure regulating valve 23 is disposed on the connecting vent pipe of the first storage tank 21, and a second pressure regulating valve 24 is disposed on the connecting vent pipe of the second storage tank 22. The bottom of the first storage tank 21 and the bottom of the second storage tank 22 are further connected to the upper part of the metering hopper B9 and the upper part of the metering hopper C10 respectively through a vent pipe. The granulating device 28 is located below the homomixing device 18, and the top of the granulating device 28 is provided with a feed hopper B27. The feed hopper B27 is connected to the bottom of the homomixing stirrer 16 through a material conveying pipe 26. The carbonization device includes a feed hopper C30, a carbonization chamber 32, a vibrating screen 33, a gasholder 35, a temperature sensor 36, and a pressure sensor 37. The feed hopper C30 is connected to the bottom of the granulating device 28 through a picking device B29, and the feed hopper C30 is connected to the top of the carbonization chamber 32 through a pipe. A feed valve 31 is arranged on the connecting pipe. The vibrating screen 33 is located inside the carbonization chamber 32 and is located below the feed hopper C30. The temperature sensor 36 and the pressure sensor 37 are disposed on an upper portion or a side wall of the carbonization chamber 32. The gasholder 35 is connected to the top of the carbonization chamber 32 through a vent pipe, and a third pressure regulating valve 34 is further disposed on the vent pipe. The collection device includes at least a lye tank 39 and a storage bin 42. The lye tank 39 is connected to the bottom of the carbonization chamber 32 through a pipe, and the connecting pipe is provided with a control valve 38. The storage bin 42 is connected to the lower part of the carbonization chamber 32 through a discharge pipe 40, and the discharge pipe 40 is provided with a discharge valve 41.

During the treatment, the silt to be treated is first transported to the pretreatment device 1 by a transport vehicle or a silt conveying pump. The pretreatment device 1 is provided with a debris removal interlayer, a sediment separation interlayer, and a dehydration and capacity reduction interlayer from top to bottom to sequentially perform processes of debris removal, sediment separation, and dehydration and capacity reduction. The debris removal process mainly targets solid debris, such as grass roots and debris bags in the soil, and then the sediment separation function is performed to separate the sediment through a mechanical screen, and finally the dehydration and capacity reduction is performed, so that the pretreated water and pretreated soil are separated and placed in the water storage tank 3 and the buffer bin 4, respectively. In order to obtain more pure liquid moisture, a layer of filtration device 2 can be disposed above the water storage tank 3 for filtering debris or non-liquid substances.

The soil in the buffer bin 4 is delivered to the metering hopper A8 through the picking device A7, meanwhile the first pressure regulating valve 23 and the second pressure regulating valve 24 are opened, and then the first solidifying agent in the first storage tank 21 and the second solidifying agent in the second storage tank 22 are delivered into the metering hopper B9 and the metering hopper C10, respectively. The ratio of soil to the solidifying agents is adjusted by the metering sensor A11, metering sensor B12 and metering sensor C13, and the amount of two solidifying agents to be added is adjusted in real time according to the moisture content of the silt, thereby achieving the optimal working efficiency. The soil, the first solidifying agent, and the second solidifying agent with a suitable proportion are respectively discharged from the metering hopper A8, the metering hopper B9 and the metering hopper C10, and all of them fall onto the conveyor belt 15, and then fall into the homomixing device 18 from the blanking end of the conveyor belt 15 through the feed hopper A17 above the homomixing device 18. The mixture is uniformly stirred in the homomixing device 18 to form a stirred mixture after homomixing. Therefore, homomixing of two different kinds of solidifying agents and the silt is achieved by the homomixing stirrer 16. Moreover, the granule size of the granulated granules can be adjusted according to the soil properties to meet the subsequent carbonization of the granules. Several processes can be operated continuously, and the overall operation has a higher consistency and integrity. At the same time, a purification device 20 is further provided, the purification device 20 is connected to the homomixing device 18 through a pipe, and the connecting pipe is provided with an exhaust fan 19. The exhaust fan 19 is provided for absorbing the carbon dioxide released during the processes of the silt pretreatment and the homomixing to avoid pollution to the surrounding environment, which is highly efficient, environment-friendly and has long-term sustainability, and can prolong the service life of the system, and reduce the economic costs.

The stirred mixture after homomixing is transferred to the granulating device 28 through the material conveying pipe 26 and the feed hopper B27 to perform granulation operation of the silt mixture. The granulation operation of the silt is moved to the granulating device 28, which overcomes the disadvantages of uneven granulation in situ due to the excessive moisture of the soil. According to the moisture content and properties of the soil, the ratio of the soil to the two solidifying agents can be adjusted for performing the granulation work better, and the solidified granules of the mixture can be obtained to facilitate the full carbonization in the next step.

The feed valve 31 is opened, and the solidified granules of the mixture flow into the vibrating screen 33 in the carbonization chamber 32 through the picking device B29 and the feed hopper C30. After the vibrating screen is covered by the solidified granules, the feed valve 31, the control valve 38 and the discharge valve 41 are closed, and the third pressure regulating valve 34 is opened to carbonize the solidified granules of the mixture to generate silt carbonized granules.

After the carbonization is completed, the third pressure regulating valve 34 is closed and then the control valve 38 is opened, so that the waste liquid and the exhaust gas flow into the lye tank 39 to be absorbed by the lye, and finally the discharge valve 41 is opened to allow the silt carbonized granules to flow into the storage bin 42 through the discharge pipe 40.

Finally, the silt carbonized granules in the storage bin 42 collected after the treatment by the above-mentioned system are reused as materials for roadbeds, airport runways or engineering backfills.

Among them, the moisture sensor 6, the metering sensor A11, the metering sensor B12, and the metering sensor C13 are connected to the integrated controller 14 through wires, respectively. The metering sensor A11 is first determined to any reference value, then the metering sensor B12 is adjusted according to the moisture monitoring value, and the metering sensor C13 is adjusted according to the target strength and hardness of the silt granules. In view of this point, the following experiments were carried out.

The degree of carbonation and strength of the silt are significantly affected by factors such as moisture content of the silt, clay (fine granule) content of the silt, the amount of the solidifying agent added, ventilation pressure, and carbonization time, etc. Taking the silt soil in Nanjing, Huai'an and Wenzhou as examples, the properties of the silt soil in the three places are different, and then the indoor element test of the solidification of the silt soil using a magnesium oxide under different conditions is carried out. The samples tested below are cylinder-shaped with a diameter of 5 cm and a height of 10 cm. The side and bottom of the sample are sealed, so that the gas is only vented from the top of the cylinder-shaped samples. Three parallel tests were performed on each group of samples, and the test results are the mean values of the three parallel tests. Tab. 1 shows the basic physical indexes of the silt soil in Nanjing, Huai'an and Wenzhou. The test results of the strength and carbonation depth of the three silt soils after carbonization are shown in Tab. 2, Tab. 3 and Tab. 4, respectively.

TABLE 1

Basic physical indexes of three kinds of silt soils

| source region | liquid limit/ $w_L$ (%) | plastic limit/ $w_P$ (%) | granule size distribution/% | | |
|---|---|---|---|---|---|
| | | | <5 μm | 5-75 μm | >75 μm |
| Nanjing | 48.6 | 24.0 | 16.9 | 68.3 | 14.8 |
| Huai'an | 60.6 | 31.7 | 28.8 | 59.3 | 11.9 |
| Wenzhou | 69.2 | 37.6 | 39.4 | 55.7 | 4.9 |

TABLE 2

Carbonation test results of silt soil in Nanjing

| No. | initial moisture content/% | MgCl$_2$ adding amount/% | MgO adding amount/% | ventilation pressure/ kPa | carbonization time/h | strength/ MPa | carbonation depth/cm |
|---|---|---|---|---|---|---|---|
| 1 | 20 | 0 | 10 | 200 | 1.5 | 1.35 | 8.6 |
| 2 | 35 | 0 | 10 | 200 | 1.5 | 1.24 | 7.3 |
| 3 | 40 | 0 | 10 | 200 | 1.5 | 1.06 | 5.7 |
| 4 | 35 | 0 | 5 | 200 | 1.5 | 0.77 | 6.4 |
| 5 | 35 | 0 | 15 | 200 | 1.5 | 1.62 | 8.2 |
| 6 | 35 | 0 | 10 | 100 | 1.5 | 1.11 | 4.5 |
| 7 | 35 | 0 | 10 | 400 | 1.5 | 1.38 | 9.0 |
| 8 | 35 | 0 | 10 | 200 | 0.5 | 0.40 | 2.8 |
| 9 | 35 | 0 | 10 | 200 | 3.0 | 1.43 | 9.7 |

TABLE 3

Carbonation test results of silt soil in Huai'an

| No. | initial moisture content/% | MgCl$_2$ adding amount/% | MgO adding amount/% | ventilation pressure/ kPa | carbonization time/h | strength/ MPa | carbonation depth/cm |
|---|---|---|---|---|---|---|---|
| 1 | 35 | 0 | 10 | 200 | 1.5 | 1.16 | 7.4 |
| 2 | 45 | 0 | 10 | 200 | 1.5 | 0.74 | 6.2 |
| 3 | 55 | 0 | 10 | 200 | 1.5 | 0.46 | 3.6 |
| 4 | 45 | 5 | 10 | 200 | 1.5 | 1.04 | 8.3 |
| 5 | 55 | 10 | 10 | 200 | 1.5 | 0.91 | 6.9 |

TABLE 4

Carbonation test results of silt soil in Wenzhou

| No. | initial moisture content/% | MgCl$_2$ adding amount/% | MgO adding amount/% | ventilation pressure/ kPa | carbonization time/h | strength/ MPa | carbonation depth/cm |
|---|---|---|---|---|---|---|---|
| 1 | 45 | 0 | 10 | 200 | 3.0 | 0.62 | 4.8 |
| 2 | 55 | 0 | 10 | 200 | 3.0 | 0.34 | 3.2 |
| 3 | 65 | 0 | 10 | 200 | 3.0 | 0.15 | 1.7 |
| 4 | 45 | 5 | 10 | 200 | 3.0 | 0.76 | 6.8 |
| 5 | 55 | 10 | 10 | 200 | 3.0 | 0.60 | 5.7 |
| 6 | 65 | 15 | 10 | 200 | 3.0 | 0.51 | 6.2 |

Example 1

If the clay content of the pretreated silt soil is less than 20%, the moisture content is 30%-40%, and the target strength is 0.6 MPa, in the homomixing process of the solidifying agents, the first solidifying agent is not selected, and the amount of the second solidifying agent is adjusted to be 10%; in the granulation process, the maximum granule size is adjusted to be 7 cm; and in the carbonization process, the ventilation pressure is controlled to be 200 kPa, and the carbonization time is controlled to be 1.5 h.

Example 2

If the clay content of the pretreated silt soil is 20%-30%, the moisture content is less than 45%, and the target strength is 0.6 MPa, in the homomixing process of the solidifying agents, the amount of the first solidifying agent is adjusted to be 5%, and the amount of the second solidifying agent is adjusted to be 10%; in the granulation process, the maximum granule size is adjusted to be 6 cm; and in the carbonization process, the ventilation pressure is controlled to be 200 kPa, and the carbonization time is controlled to be 1.5 h.

Example 3

If the clay content of the pretreated silt soil is less than 20%, the moisture content is 30%-40%, and the target strength is 0.8 MPa, in the homomixing process of the solidifying agents, the first solidifying agent is not selected, and the amount of the second solidifying agent is adjusted to be 15%; in the granulation process, the maximum granule size is adjusted to be 6 cm; and in the carbonization process, the ventilation pressure is controlled to be 200 kPa, and the carbonization time is controlled to be 3.0 h.

Example 4

If the clay content of the pretreated silt soil is less than 20%, the moisture content is more than 40%, and the target strength is 0.8 MPa, in the homomixing process of the solidifying agents, the amount of the first solidifying agent is adjusted to be 10%, and the amount of the second solidifying agent is adjusted to be 15%; in the granulation process, the maximum granule size is adjusted to be 6 cm; and in the carbonization process, the ventilation pressure is controlled to be 200 kPa, and the carbonization time is controlled to be 3.0 h.

Example 5

If the clay content of the pretreated silt soil is more than 30%, the moisture content is less than 55%, and the target strength is 0.8 MPa, in the homomixing process of the solidifying agents, the amount of the first solidifying agent is adjusted to be 10%, and the amount of the second solidifying agent is adjusted to be 10%; in the granulation process, the maximum granule size is adjusted to be 6 cm; and in the carbonization process, the ventilation pressure is controlled to be 200 kPa, and the carbonization time is controlled to be 1.5 h.

Example 6

If the clay content of the pretreated silt soil is more than 30%, the moisture content is more than 55%, and the target strength is 0.8 MPa, in the homomixing process of the solidifying agents, the amount of the first solidifying agent is adjusted to be 15%, and the amount of the second solidifying agent is adjusted to be 15%; in the granulation process, the maximum granule size is adjusted to be 4 cm; and in the carbonization process, the ventilation pressure is controlled to be 400 kPa, and the carbonization time is controlled to be 3.0 h.

Example 7

If the clay content of the pretreated silt soil is less than 20%, the moisture content is less than 30%, and the target strength is 1.0 MPa, in the homomixing process of the solidifying agents, the first solidifying agent is not selected, and the amount of the second solidifying agent is adjusted to be 10%; in the granulation process, the maximum granule size is adjusted to be 10 cm; and in the carbonization process, the ventilation pressure is controlled to be 100 kPa, and the carbonization time is controlled to be 1.5 h.

Example 8

If the clay content of the pretreated silt soil is less than 20%, the moisture content is less than 30%, and the target strength is 0.4 MPa, in the homomixing process of the solidifying agents, the first solidifying agent is not selected, and the amount of the second solidifying agent is adjusted to be 10%; in the granulation process, the maximum granule size is adjusted to be 8 cm; and in the carbonization process, the ventilation pressure is controlled to be 200 kPa, and the carbonization time is controlled to be 0.5 h.

Examples 1 and 2 are compared, Examples 3-6 are compared, and Example groups (1 and 2), (3-6), 7 and 8 are compared. It can be seen that when the silt is subjected to an ex-situ treatment on site, that is, when the silt soil and the two kinds of solidifying agents are homomixed in the homomixing device, and subsequently in the granulation device, the amounts of solidifying agents to be added, the granule size of the granulated granules, the ventilation pressure and the carbonization time can be adjusted according to the moisture content and the clay content of the pretreated silt soil, and the expected strength of the soil granules.

Embodiment 1

A method for ex-situ carbonization and solidification of silt soil using an active magnesium oxide includes the following steps.

a. Silt pretreatment: The silt to be treated is first transported to the pretreatment device 1 by a transport vehicle or a silt conveying pump to sequentially perform the processes of debris removal, sediment separation, and dehydration and capacity reduction. The debris removal process mainly targets solid debris, such as grass roots and debris bags in the soil, and then the sediment separation function is opened to separate the sediment through a mechanical screen, and finally the dehydration and capacity reduction is performed, so that the pretreated water and pretreated soil are separated and placed in the water storage tank 3 and the buffer bin 4, respectively.

b. Homomixing of solidifying agent: The soil in the buffer bin 4 is delivered to the metering hopper A8 through the picking device A7, meanwhile the first pressure regulating valve 23 and the second pressure regulating valve 24 are opened, and then the first solidifying agent in the first storage tank 21 and the second solidifying agent in the second storage tank 22 are delivered into the metering hopper B9 and the metering hopper C10, respectively. The ratio of soil to the solidifying agents is adjusted by the metering sensor A11, metering sensor B12 and metering sensor C13, and the amounts of the two solidifying agents to be added are adjusted in real time according to the moisture content of the silt, thereby achieving the optimal working efficiency. The soil, the first solidifying agent, and the second solidifying agent with a suitable proportion are respectively discharged from the metering hopper A8, the metering hopper B9 and the metering hopper C10, and all of them fall onto the conveyor belt 15, and then fall into the homomixing device 18 from the blanking end of the conveyor belt 15 through the feed hopper A17 above the homomixing device 18. The mixture is uniformly stirred in the homomixing device 18 to form a stirred mixture after homomixing. Therefore, homomixing of two different kinds of solidifying agents and the silt was achieved by the homomixing stirrer 16. Moreover, the granule size of the granulated granules can be adjusted according to the soil properties to meet the subsequent carbonization of the granules. Several processes can be operated continuously, and the overall operation has a higher consistency and integrity.

c. Silt granulation: The stirred mixture after homomixing is transferred to the granulating device 28 through the material conveying pipe 26 and the feed hopper B27 to perform granulation operation of the silt mixture. The granulation operation of the silt is moved to the granulating device 28, which overcomes the disadvantages of uneven granulation in situ due to the excessive moisture of the soil. According to the different moisture contents and properties of the soil, the ratio of the soil to the two solidifying agents in the step b can be adjusted for performing the granulation work better, and the solidified granules of the mixture can be obtained to facilitate the full carbonization in the next step.

d. Carbonization by carbon dioxide: The solidified granules of the mixture obtained after the step c flow into the vibrating screen 33 in the carbonization chamber 32 through the picking device B29 and the feed hopper C30. After the vibrating screen is covered by the solidified granules, the feed valve 31, the control valve 38 and the discharge valve 41 are closed, and the third pressure regulating valve 34 is opened to carbonize the solidified granules of the mixture to generate silt carbonized granules. The mobile carbonization chamber 32 and the vibrating screen 33 in the carbonization chamber 32 are used to enable the magnesium oxide solidified granules to be fully carbonized, thereby avoiding the escape and waste of carbon dioxide during in-situ carbonization and solidification, and improving the utilization efficiency of carbon dioxide. Meanwhile, the uniformity of the carbonization effect of the magnesium oxide solidified silt granules is improved by the vibration of the granules.

e. Exhaust gas/waste liquid collection: The carbonized granules generated after the step d are collected, and the waste liquid and the exhaust gas produced in the technological process are simultaneously absorbed using lye.

f. Resource utilization: The silt carbonized granules obtained after the above steps are reused as materials for roadbeds, airport runways or engineering backfills.

This method is simple and easy to operate, and the overall process is coherent and efficient, which can fully mix the silt and the solidifying agents and quickly carbonize the solidified silt granules using magnesium oxide. In the overall process of this method, the amount of land occupied by silt generated in engineering due to waste disposal of the silt can be reduced. At the same time, the pollution to the surrounding environment is less, and the whole process has low-carbon footprint, is environment-friendly and sustainable.

Embodiment 2

On the basis of the Embodiment 1, the moisture monitoring value of the pretreated soil obtained in the step a is obtained through a moisture sensor 6. The soil, the first solidifying agent and the second solidifying agent in the step b are respectively provided with a metering sensor A11, a metering sensor B12 and a metering sensor C13. The metering sensor A11 is first adjusted to any reference value, then the metering sensor B12 is adjusted according to the moisture monitoring value, and the metering sensor C13 is adjusted according to the target strength and hardness of the silt granules.

According to the moisture content and the clay content of the pretreated silt soil, and the expected strength of the soil granules, the expected silt properties can be achieved by adjusting the amounts of the two solidifying agents to be added in different proportions, the granule size of the granulated granules, the ventilation pressure and the carbonization time.

At the same time, in many experiments with different silt soil properties and different environmental parameters, the obtained solidified granules of the mixture have a granule size ranging from 1 cm to 10 cm. Therefore, when the granule size of the solidified granules of the mixture is in the range of 1 cm to 10 cm, and with different environmental parameters and silt properties, the carbonization and solidification of silt is the best.

Embodiment 3

On the basis of the above Embodiments, the solid debris in the step a are removed by a mechanical nail rake or a mechanical screen, and the sediment separation is mainly achieved through mechanical centrifugation or geonet bag, the overall operation is easy and the efficiency is higher.

The first solidifying agent may be anhydrous magnesium chloride powder or a powder mixture of anhydrous magnesium chloride and anhydrous calcium chloride; and the second solidifying agent may be active magnesium oxide powder or a powder mixture of active magnesium oxide and calcium oxide. Using an environment-friendly active magnesium oxide as the main solidifying agent, a large amount of carbon dioxide gas can be fully absorbed during the carbonization and consolidation process, and environmental pollution can be avoided as much as possible.

The lye in the step e may be a sodium hydroxide solution, which is easy to obtain and has low cost, and is convenient and non-hazardous for use. The overall method does not require long-term curing, and can be completed in a short time, and is efficient and convenient.

The basic principles, main features and advantages of the present invention have been shown and described above. It should be understood by those skilled in the art that the present invention is not limited by the foregoing embodiments. The above embodiments and descriptions in the specification are merely illustrative of the principles of the present invention. Various changes and modifications may be derived without departing from the spirit and scope of the present invention, which fall within the scope of the present invention. The protective scope of the present invention is defined by the appended claims and the equivalents thereof.

What is claimed is:

1. A treatment system for an ex-situ carbonization and solidification of silt soil using an active magnesium oxide, comprising a pretreatment device, a solidifying agent supply device, a homomixing device, a granulating device, a carbonization device, and a collection device; wherein the pretreatment device is respectively connected to a water storage tank and a buffer bin, and the buffer bin is further provided with a moisture sensor;

the homomixing device comprises a first metering hopper, a second metering hopper, a third metering hopper, a conveyor belt, a homomixing stirrer and a first feed hopper;

the first metering hopper is connected to the buffer bin through a first picking device; the conveyor belt is located at lower portions of the first metering hopper, the second metering hopper, and the third metering hopper; the first feed hopper is located below a blanking end of the conveyor belt, and the first feed hopper is fixed above the homomixing stirrer; bottoms of the first metering hopper, the second metering hopper, and the third metering hopper are respectively provided with a first metering sensor, a second metering sensor and a third metering sensor;

the solidifying agent supply device comprises a first storage tank and a second storage tank, and the first storage tank and the second storage tank are respectively connected to an air compressor through a first vent pipe; a first pressure regulating valve is disposed on the first vent pipe of the first storage tank, and a second pressure regulating valve is disposed on the first vent pipe of the second storage tank; a bottom of the first storage tank and a bottom of the second storage tank are further respectively connected to an upper part of the second metering hopper and an upper part of the third metering hopper through a second vent pipe;

the granulating device is located below the homomixing device, and a top of the granulating device is provided with a second feed hopper; and the second feed hopper is connected to a bottom of the homomixing stirrer through a material conveying pipe;

the carbonization device comprises a third feed hopper, a carbonization chamber, a vibrating screen, a gasholder, a temperature sensor, and a pressure sensor; the third feed hopper is connected to the bottom of the granulating device through a second picking device, and the third feed hopper is connected to the top of the carbonization chamber through a first pipe; a feed valve is arranged on the first pipe; the vibrating screen is located inside the carbonization chamber and is located below the third feed hopper; the temperature sensor and the pressure sensor are disposed on an upper portion or a side wall of the carbonization chamber; the gasholder is connected to the top of the carbonization chamber through a third vent pipe, and a third pressure regulating valve is further disposed on the third vent pipe; and the collection device comprises a lye tank and a storage bin; the lye tank is connected to a bottom of the carbonization chamber through a second pipe, and the second pipe is provided with a control valve, and the storage bin is connected to a lower part of the carbonization chamber through a discharge pipe; and the discharge pipe is provided with a discharge valve.

2. The treatment system according to claim 1, further comprising a purification device, wherein the purification device is connected to the homomixing device through a third pipe, and the third pipe is provided with an exhaust fan.

3. The treatment system according to claim 2, wherein the pretreatment device is provided with a debris removal interlayer, a sediment separation interlayer, and a dehydration and capacity reduction interlayer from top to bottom.

4. The treatment system according to claim 3, wherein the moisture sensor, the first metering sensor, the second metering sensor, and the third metering sensor are connected to an integrated controller through wires, respectively.

5. The treatment system according to claim 3, wherein a maximum aperture of the vibrating screen is smaller than a minimum granule size produced by the granulating device.

6. A method for treating silt soil, comprising the following steps:
 ex-situ carbonizating and solidificating the silt soil by adding an active magnesium oxide in the treatment system according to claim 1;
 adjusting granule size of the granules granulated by the granulating device in the treatment system dynamically according to soil properties and moisture content of the silt soil.

7. The method for treating silt soil according to claim 6, wherein the treatment system further comprises a purification device, and the purification device is connected to the homomixing device through a third pipe, and the third pipe is provided with an exhaust fan.

8. The method for treating silt soil according to claim 7, wherein the pretreatment device is provided with a debris removal interlayer, a sediment separation interlayer, and a dehydration and capacity reduction interlayer from top to bottom.

* * * * *